United States Patent [19]

Gajewski

[11] Patent Number: 4,931,706

[45] Date of Patent: Jun. 5, 1990

[54] ELECTRICAL CIRCUIT FOR PROTECTING A POWER SUPPLY CONNECTED TO APPLY SIGNALS TO A RETRACTABLE SUNROOF CONTAINING MATERIALS THAT RESPOND TO AN APPLIED ELECTRICAL SIGNAL

[75] Inventor: Kenneth J. Gajewski, Woodhaven, Mich.

[73] Assignee: Ford Motor Company, Dearborn, Mich.

[21] Appl. No.: 253,524

[22] Filed: Oct. 5, 1988

[51] Int. Cl.$^5$ ............................................... H02P 3/00
[52] U.S. Cl. .................................... 318/282; 318/286; 307/10.1
[58] Field of Search ................ 318/266, 267, 282–286; 296/215, 216, 218, 223, 219, 211; 73/117.2; 350/444, 330, 331 R, 332; 307/10.1, 10.2; 361/31, 23

[56] References Cited

U.S. PATENT DOCUMENTS 4,438,972 3/1984 Katayama et al. ............. 318/266 X
4,468,063 8/1984 Yukimoto et al. .
4,561,691 12/1985 Kawai et al. ...................... 296/216
4,629,953 12/1986 Inoue et al. ...................... 318/286 X
4,634,945 1/1987 Takemura et al. ............. 318/266 X
4,659,141 4/1987 Masuda et al. .
4,688,895 8/1987 Jacob .
4,705,959 11/1987 Kiyono et al. ...................... 307/10.1
4,766,413 8/1988 Reavell ............................ 318/282 X

OTHER PUBLICATIONS

1987 Taurus/Sable Shop Manual, section 46-07 "Moon-Roof, Electric", pp. 46-07-1 through 46-07-8.

Primary Examiner—William M. Shoop, Jr.
Assistant Examiner—A. Jonathan Wysocki
Attorney, Agent, or Firm—Paul K. Godwin, Jr.; Clifford L. Sadler

[57] ABSTRACT

An electrical circuit connected to a drive motor circuit, of a movable sunroof panel containing an electrical field responsive material, for preventing the energization of a power supply prior to the panel being electrically connected to the output of the power supply.

7 Claims, 3 Drawing Sheets

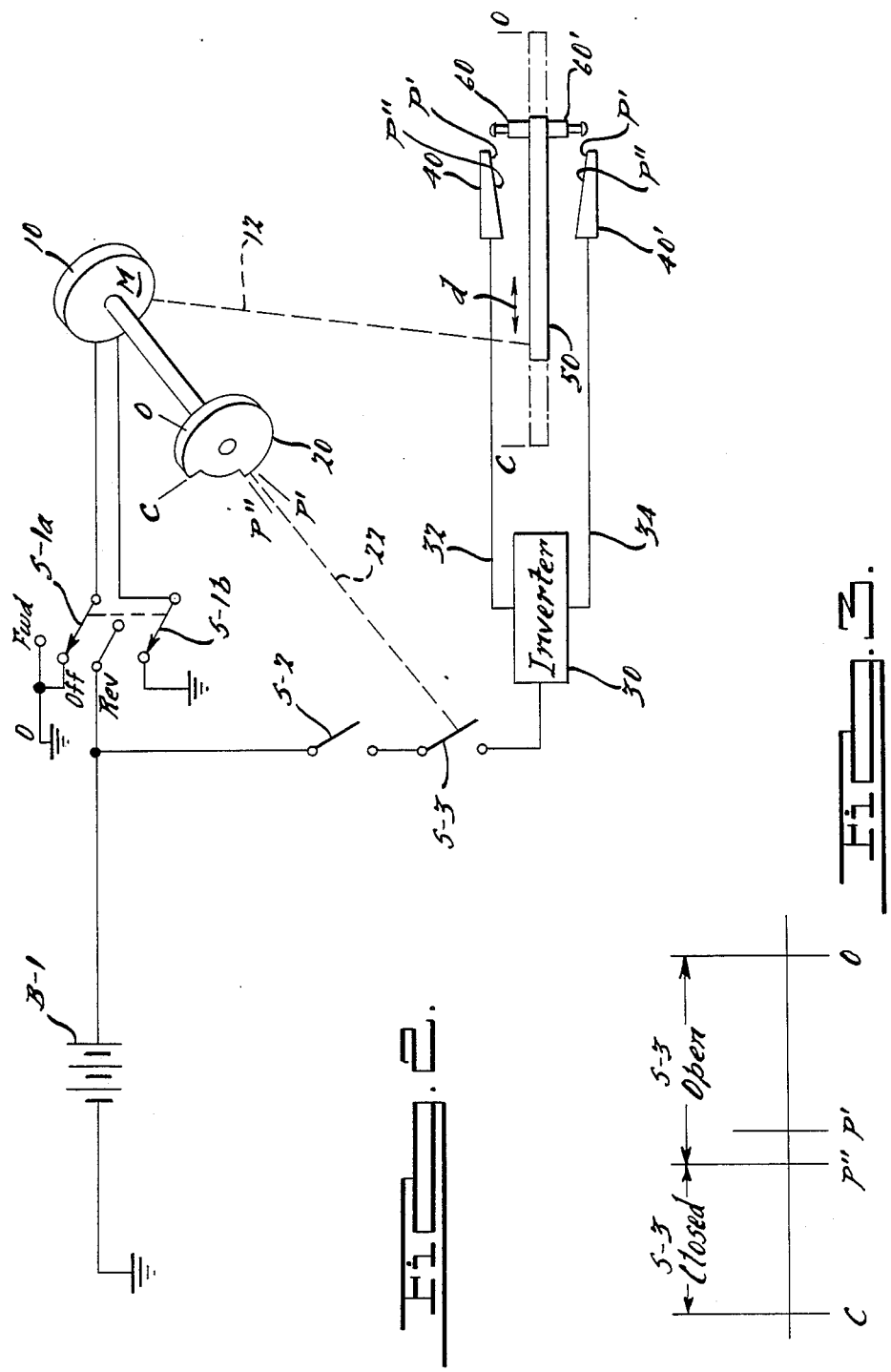

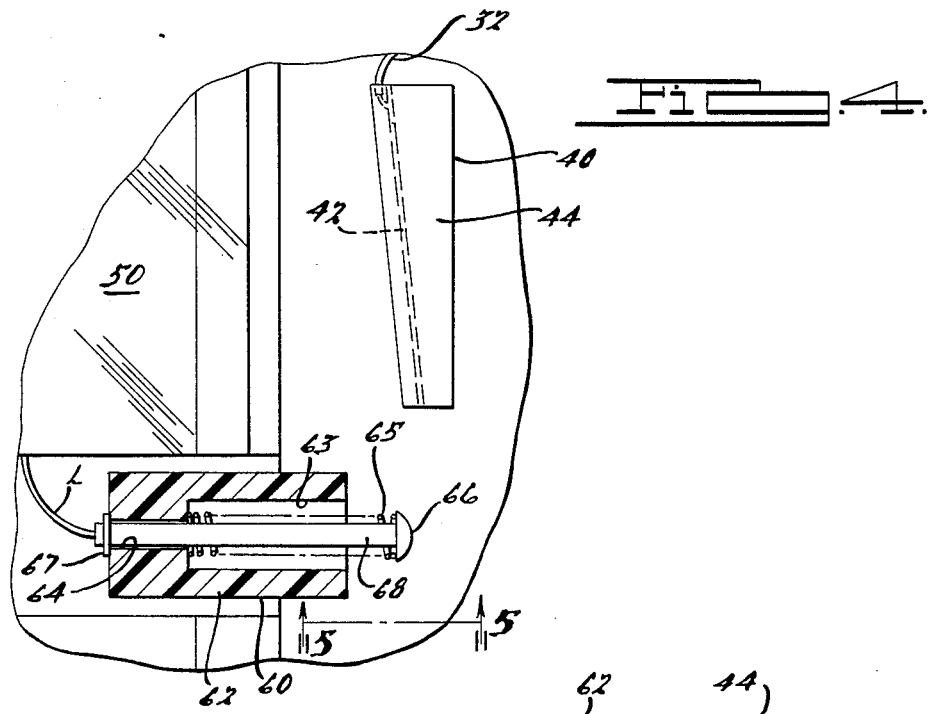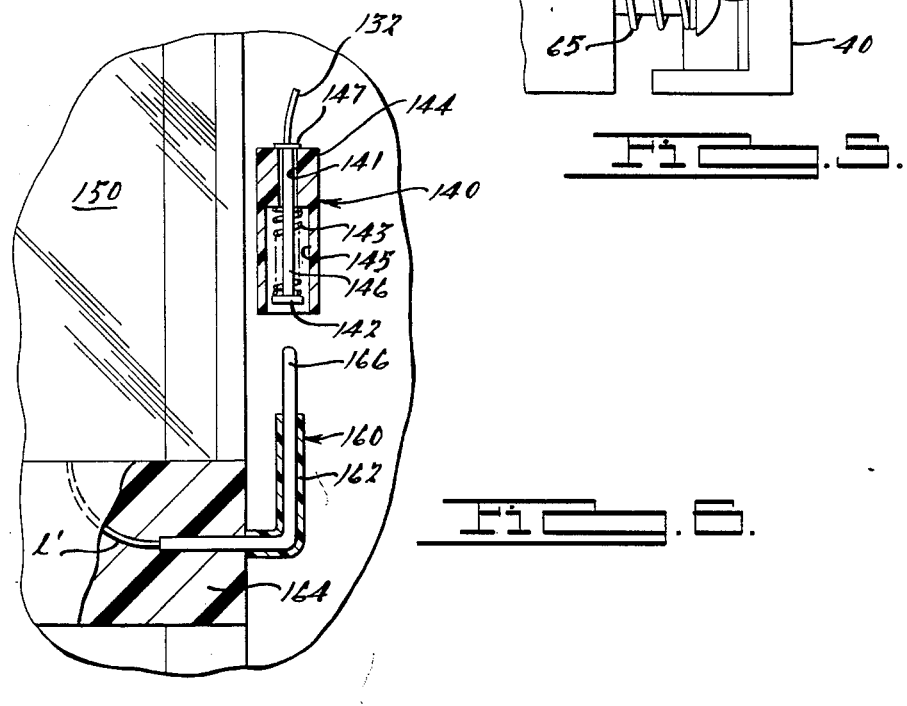

4,931,706

ELECTRICAL CIRCUIT FOR PROTECTING A POWER SUPPLY CONNECTED TO APPLY SIGNALS TO A RETRACTABLE SUNROOF CONTAINING MATERIALS THAT RESPOND TO AN APPLIED ELECTRICAL SIGNAL

RELATED APPLICATION

This application is related to copending application Ser. No. 253,660, filed on Oct. 5, 1988, entitled "Electrical Connectors For Use With A Retractable Sunroof Containing Elements That Respond To An Applied Electrical Signal" which is commonly assigned to the assignee hereof.

BACKGROUND OF THE INVENTION

1. Field of the Invention

The present invention is directed to the field of movable roof panels on automotive vehicles and more specifically to the area of providing electrical energy directly to such panels which contain electrical field responsive materials.

2. Background Information

The use of movable roof panels (sometimes referred to as sunroofs or moonroofs) on automotive vehicles is quite common and several prior art mechanisms are known to provide electro/mechanical movement to open and close the panels. For instance, U.S. Pat. Nos. 4,659,141 and 4,468,063 describe the use of an electric motor and a mechanical linkage to move a sunroof panel between a fully closed and a fully retracted position.

U.S. Pat. No. 4,688,895 describes the use of liquid crystal materials in various zones of a light transmitting sunroof in order to control the amount of light transmitted through the panel.

However, the technique for applying electrical energy directly to a movable sunroof panel needs specific attention in order to obtain reliability and avoid damage to the power supply which provides the electrical energy.

SUMMARY OF THE INVENTION

The present invention is utilized to supply electrical energy directly to a movable roof panel. The retractable sunroof panel may contain a material that is sensitive to the application of electrical energy to control the amount of light transmitted through the panel, such as a liquid crystal or an electrochromic material sandwiched between transparent electrodes on opposing surfaces. It may contain light emitting materials such as electroluminescent strips for providing interior lighting when the panel is closed.

The control of the application of electrical energy to the retractable sunroof panel in the preferred embodiment is such that the application of the electrical energy to the panel is desired to be made only when the roof panel is in its fully closed position or within a short distance therefrom. In addition, it is desired to have the electrical load of the sunroof panel electrically connected to the power source output before that power source is energized. Accordingly, electrical connections made between the power source output and the movable sunroof panel are made through an electrical connector system when the panel is near, as well as in, its fully closed position.

The present invention achieves the desired result by providing an electrical connector system that directly connects to the output of the electrical power supply to the movable sunroof prior to reaching its closed position, and by employing a circuit that prevents energization of the power supply without the load being connected. During that distance of electrical contact, appropriate energy is allowed by the protection circuit to be supplied by the associated power supply to control the variable transmittance or light emitting elements on the sunroof panel.

It is therefore an object of the present invention to provide a circuit which functions in time with movable and stationary electrical contact elements aligned to provide an electrical energy connection to a movable sunroof panel when it is near its fully closed position.

It is another object of the present invention to provide a circuit which protects a dedicated power supply for a movable sunroof application from being energized prior to having the sunroof load connected to its output.

BRIEF DESCRIPTION OF THE DRAWINGS

FIG. 2 is a schematic of an electrical circuit embodiment of the present invention.

FIG. 3 is a position diagram used to describe the operation of the schematic shown in FIG. 2.

FIGS. 4 and 5 are detailed views of the connectors shown in FIGS. 1 and 2.

FIG. 6 is a detailed diagram showing another set of connectors that may be used in conjunction with the invention.

DESCRIPTION OF THE PREFERRED EMBODIMENTS

Figure 1:
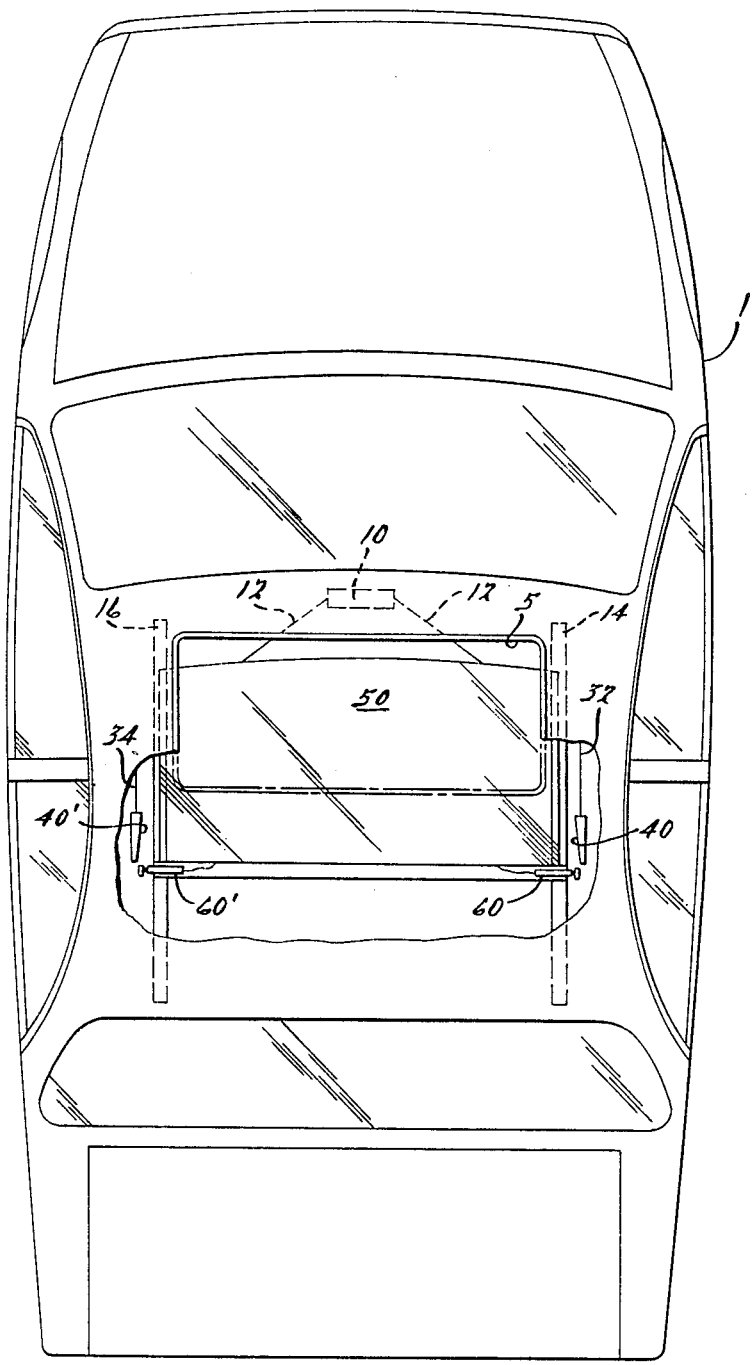
FIG. 1 a top view of an automotive vehicle illustrating electrical connectors and a movable sunroof panel that are used in conjunction with the circuit of the present invention.

In the present invention, the application of an electrical field to the responsive materials on the sunroof panel is desired only when the sunroof is near or at its fully closed position. In addition, the power supply used to provide the signal which establishes the electric field to the responsive materials is susceptible to burn out if it is energized without a load being connected across its output. Therefore, the present invention protects the power supply from being energized when the sunroof panel 50 is not connected to the power supply.

The vehicle 1 shown in FIG. 1 contains a roof aperture 5 which may be opened or closed by the retractable linear movement of a sunroof panel 50. In this case the sunroof panel 50 is linearly movable between a fully opened and a fully closed position by the use of a drive motor 10, a linkage 12 and tracks 14 and 16. The electro/mechanical mechanism employed to move the sunroof panel 50 may be of any conventional design. In this case, the electro/mechanical linkage is the same as that described in Ford Motor Company publication entitled 1987 *Taurus/Sable Shop Manual.* section 46-07 "MoonRoof, Electric", pages 46-07-1 through 46-07-8.

The sunroof panel 50 is of the type which contains an electrically responsive medium, such as a liquid crystal or electrochromic material sandwiched between opposing transparent conductors. In an alternative embodiment, the panel 50 may be configured with electroluminescent films that are energizable to emit light into the vehicle when an electric voltage is applied.

As shown in FIG. 1, a pair of contact elements 40 and 40' are fixedly connected adjacent tracks 14 and 16. The contact elements 40 and 40' are located a sufficient distance behind the aperture 5 to prevent the inadvertent contact by passengers within the vehicle. The contact elements 40 and 40' are connected through respective wires 32 and 34 to a power supply unit that is discussed below with reference to FIG. 2.

A pair of relatively movable contact elements 60 and 60' are mounted on the rearward edge of the movable panel 50 and are spaced so as to make corresponding electrical contact with the contact elements 40 and 40' when the panel 50 is positioned within a limited distance near its fully closed position.

FIG. 2 schematically represents an embodiment of the control circuit of the present invention for supplying electrical energy to the movable sunroof panel 50. The circuit provides protection for an inverter circuit 30 by preventing the inverter 30 from being energized prior to having the electrical load connected to its output. Such a load connection is made by completing contact between connector elements 40 and 60 and 40' and 60'.

In the illustrated circuit, a DC power supply B-1 is connected to a pair of ganged switches S-1a and S-1b that control the polarity of voltage applied to a DC drive motor 10 (and as a consequence, the direction of sunroof panel movement). The selection of polarity controls the directional movement of the drive motor 10. The battery B-1 is also connected to a manually actuatable switch S-2 that is in series with a cam-operated switch S-3. Switch S-2 is actuatable by a vehicle passenger whenever it is desired to energize the electrically responsive material on the movable sunroof panel 50. When both switches S-2 and S-3 are in their closed positions, the inverter 30 is supplied with power from the battery B-1 and provides an appropriate AC output signal on lines 32 and 34 to energize the electrically responsive material provided on the movable sunroof 50. (In the case where the electrically responsive material is a liquid crystal, the inverter 30 would output an AC signal of approximately 90-100 volts, 30-400 Hz. And in the case where an electroluminescent material is used, an AC voltage of 130-150 volts, 400-600 Hz is output.) Lines 32 and 34 are respectively connected to fixed contact elements 40 and 40'. Corresponding movable contact elements 60 and 60' are attached to the rearward edge of the movable sunroof panel 50 so as to make contact with the fixed contacts 40 and 40' at a point P'.

A cam 20 is shown as being rotatably connected to drive motor 10 and directly controlling the opening and closing of switch S-3. Control of switch S-3 is represented by broken line 22. Broken line 12, extending between the motor 10 and the movable sunroof panel 50, represents the mechanical retraction linkage discussed above with respect to FIG. 1 to move the panel in a corresponding direction.

In operation, switch S-1 is manually actuated from its off position to either a reverse or forward position which appropriately energizes the motor 10 with a DC voltage that drives the sunroof 50 in a corresponding linear direction via its linkage 12. The cam 20 contains an upper surface which holds switch S-3 in its open condition and a stepped down surface in which the switch S-3 is closed. As the drive motor 10 rotates to drive the sunroof 50 either towards its fully open position O or its fully closed position C, the cam 20 is rotated and activities the switch S-3 to be open between points O and P'' and to be closed between point C and P''.

Moving from a fully opened position O towards the fully closed position C, the spring loaded contacts 60 and 60' make first contact with the fixed contact elements 40 and 40' at a point P' as indicated. As the sunroof 50 continues towards the closed position, the contacts 60 and 60' continue past a point P'' that corresponds to the P'' step on the cam 20. At that point, the switch S-3 is closed to allow the manual control of the inverter 30 through switch S-2, if desired. The contacts 60 and 60' make contact with elements 40 and 40' for the remainder of the distance the sunroof moves towards its fully closed position.

The diagram in FIG. 3 illustrates the relationship of the opened and closed conditions of switch S-3 over the extent of movement of the sunroof 50. FIG. 3 illustrates the period of overlap between the point the actual load is connected to the inverter output (P') and the point at which supply voltage is allowed to be applied to the inverter 30 (P''). In accordance with the invention, the inverter 30 is prevented from outputting an energizing signal until such time as the load is connected.

FIGS. 4 and 5 offer close-up views of the connector embodiment shown in FIGS. 1 and 2.

A first portion of the connector is shown as a relatively fixed electrical contact 40. Contact 40 is formed of an insulating block 44 that contains a ramped conducting surface 42. The connecting surface 42 is connected to a leadwire 32.

A second portion of the connector is shown as relatively movable electrical contact 60. Contact 60 is formed of an insulating block 62 that is rigidly connected to the rear end of the movable sunroof panel 50. The insulator block 62 contains a central bore that extends transverse to the direction of movement of the panel 50. A first portion 63 of the bore extends from the outer end towards the center of the block 60. A second portion 64 of the bore extends from the end of bore portion 63 to the opposite end of the block 60. In the embodiment shown, bore 63 has a larger diameter than bore 64. An electrically conducting plunger 68 is mounted within the first and second bore portions 63 and 64 and has a diameter which is slightly less the bore portion 64 to allow for longitudinal movement therein. The plunger 68 contains a contact button 66 that is intended to make contact with the contact surface 42 when the sunroof panel 50 is moved towards its closed position. A spring 65 biases the plunger and contact button 66 outwardly from the block 60. A retaining ring 67 is formed on the opposite end of the plunger 68 from the contact button 66 and serves to retain the plunger and spring within the bore of the block 62.

FIG. 6 illustrates another embodiment of a connector that is suitable to supply electrical voltage to the movable sunroof panel. In this case the movable sunroof panel 150 is mounted for longitudinal movement along the vertical direction of the page. A first portion 140 of the electrical connector is rigidly connected to the vehicle and includes an insulator block 144. The block 144 contains a retractable plunger 146 that contains an enlarged end contact cap 142. The end cap 142 and the plunger 146 are formed of an electrically conducting material and are connected to a supply lead 132. The block 144 contains a central bore which is parallel to the directional movement of the panel 150 and surrounds the plunger 146. The bore includes a first portion 145 that extends from a rearward directed opening to a point near the center of the block 144, and a second portion 141 extending from the forward portion of the block 144 towards the center. The bore portion 141 is of a diameter that is smaller than bore portion 145, but large enough to accommodate the sliding motion of the plunger 146. A biasing spring 143 is located within the first portion 145 of the bore and serves to bias the plunger towards the rearward opening of the bore. A retaining ring 147 is attached to the forward end of the plunger 146 to hold the plunger within the block 144 against the biasing forces of the spring 143.

The second portion 160 of the connector is shown as containing an insulated block 164 attached to the rearward end of the sunroof panel 150. The portion 160 contains a probe 166 which extends outwardly from the block 164 and parallel to the direction of movement of the sunroof 150 in alignment with the permitted movement of plunger 146. The probe 166 is formed of a rigid metal rod that has one end embedded in the block 164 and is bent to be aligned with the enlarged end contact cap 142 of the plunger 146. An insulating sheathing material 162 is shown as surrounding a central portion of the probe 166 and may be formed of a rigid plastic material that adds stabilizing support to the probe.

In the case of the connector embodiment shown in FIG. 6, the distance over which electrical contact is made between the contact elements 140 and 160, from the fully closed position of the movable sunroof panel 150, is defined by the distance that the plunger 146 is allowed to be compressed within the bore of the block 144.

Although only one embodiment of the protection circuit has been disclosed, it is expected that many variations can be made without departing from the basic concept of the invention. Accordingly, the following claims are intended to include all such variations which fall within the true spirit and scope of the invention.

I claim:

1. A circuit connected to a mechanism for controlling the movement of a retractable sunroof panel on an automotive vehicle, wherein the sunroof panel contains elements that react to the application of an electrical signal, comprising:
    a source of drive voltage;
    a motor connected to said mechanism for controlling the movement of said sunroof panel;
    a first switch means connected between said source and said motor for selecting the drive direction of said sunroof panel;
    a second switch means mechanically connected to said motor to open and close a first conducting path to said sunroof panel elements and a second conducting path to said source according to predetermined positions of said sunroof panel; and
    a power supply means being connectable through said second switch means via said second conducting path to said source and via said first conducting path to said sunroof panel elements for applying said electrical signal thereto.

2. A circuit as in claim 1, wherein said second switch means provides closed first and second conducting paths when said sunroof panel is in its fully closed position.

3. A circuit as in claim 1, wherein said second switch means includes connector means containing contact elements on said sunroof panel and on said vehicle which are mated to close said first conducting path when said sunroof panel is positioned near its closed position and continue to be mated while said panel is moved to its closed position.

4. A circuit as in claim 3, wherein said second switch means is synchronized to provide said closed second conducting path only when said connector means contacts are mated to close said first conducting path.

5. A circuit for preventing unloaded energization of a power supply having an output that supplies an electrical signal to a signal reactive medium in a retractable vehicle sunroof panel comprising:
    a bidirectional motor means mechanically linked to said sunroof panel for moving said panel between retracted and closed positions;
    a voltage source;
    first switch means providing a connection between said voltage source and said motor means, for selecting the direction said motor is driven, and for disconnecting said motor from said voltage source;
    second switch means connected to said motor means, said sunroof panel, said power supply and said voltage source for providing a closed first electrically conducting path between the output of said power supply and said reactive medium in said sunroof panel when said panel is moved to within a first predetermined distance from its closed position, and for providing a closed second electrically conducting path between said voltage source and said power supply to energize said power supply only when said panel is moved to within a second predetermined distance from its closed position, wherein said first predetermined distance is greater than said second predetermined distance.

6. A circuit is in claim 5, wherein said second switch means includes connector means containing contact elements on said sunroof panel and on said vehicle which are mated to close said first electrically conducting path when said sunroof panel is moved to locations within said first predetermined distance from its closed position.

7. A circuit as in claim 6, wherein said second switch means includes means synchronized with the movement of said sunroof panel to maintain said second electrical conducting path opened whenever said sunroof panel is moved to locations that are greater than second predetermined distance from its closed position.

* * * * *